(12) United States Patent
Leblanc

(10) Patent No.: US 11,987,280 B2
(45) Date of Patent: May 21, 2024

(54) PULLEY ASSEMBLIES FOR USE IN MODULAR UTILITY SYSTEMS

(71) Applicant: ARCHI ENTERPRISES INC., Vancouver (CA)

(72) Inventor: Alexander Leblanc, Vancouver (CA)

(73) Assignee: ARCHI ENTERPRISES INC., Vancouver (CA)

( * ) Notice: Subject to any disclaimer, the term of this patent is extended or adjusted under 35 U.S.C. 154(b) by 0 days.

(21) Appl. No.: 18/213,254

(22) Filed: Jun. 22, 2023

(65) Prior Publication Data

US 2023/0347958 A1 Nov. 2, 2023

Related U.S. Application Data

(60) Division of application No. 16/678,951, filed on Nov. 8, 2019, now Pat. No. 11,697,445, which is a
(Continued)

(51) Int. Cl.
*B62B 3/00* (2006.01)
*B62B 3/02* (2006.01)
(Continued)

(52) U.S. Cl.
CPC ............. *B62B 3/02* (2013.01); *B62B 3/0637* (2013.01); *B66C 23/36* (2013.01); *B66F 9/08* (2013.01);
(Continued)

(58) Field of Classification Search
CPC ..... B62B 3/0637; B62B 3/02; B62B 2203/02; B62B 2203/11; B62B 2501/04; B66C 23/36; B66F 9/08
See application file for complete search history.

(56) References Cited

U.S. PATENT DOCUMENTS 5,033,705 A * 7/1991 Reagan ................. B66F 11/048
248/123.11
5,064,079 A * 11/1991 Bowerman ............. B66C 19/02
212/175

(Continued)

FOREIGN PATENT DOCUMENTS

CN 203783320 U 8/2014
WO 2004/036060 A1 4/2004

OTHER PUBLICATIONS

International Search Report issued in International Application No. PCT/CA2018/051193, dated Jan. 4, 2019 (4 pages).
(Continued)

*Primary Examiner* — Emmanuel M Marcelo
(74) *Attorney, Agent, or Firm* — Osha Bergman Watanabe & Burton LLP

(57) ABSTRACT

A counterbalanced vertical track assembly which may be configured with three types of pulley support assemblies are herein disclosed. The first type of pulley support assembly has a pair of opposed pulley modules having an elongate structural element interposed the two pulley modules which are attached to end plates at both ends of the elongate structural element. The second type of pulley support assembly has a pair of opposed pulley modules which include male end connectors for demountable engagement of the pulley modules with another module of the system with female ends. The third type of pulley support assembly has a pair of opposed pulley modules wherein the modules' pulley brackets are repositionable to varying angular orientations by alternating screw mount positions selected on mount components at opposite ends of an elongate structural element.

8 Claims, 12 Drawing Sheets

Related U.S. Application Data continuation of application No. PCT/CA2018/051193, filed on Sep. 21, 2018.

(51) Int. Cl.

| | | |
|---|---|---|
| *B62B 3/06* | (2006.01) | |
| *B66C 23/36* | (2006.01) | |
| *B66F 9/08* | (2006.01) | |
| *E04G 25/04* | (2006.01) | |
| *F16B 7/10* | (2006.01) | |
| *F16B 7/14* | (2006.01) | |
| *F16M 11/26* | (2006.01) | |

(52) U.S. Cl.
CPC ............... *E04G 25/04* (2013.01); *F16B 7/10* (2013.01); *F16B 7/14* (2013.01); *B62B 2203/02* (2013.01); *B62B 2203/11* (2013.01); *B62B 2501/04* (2013.01); *F16M 11/26* (2013.01)

(56) References Cited

U.S. PATENT DOCUMENTS

| | | | | |
|---|---|---|---|---|
| 5,730,450 A | * | 3/1998 | Chapman | F16M 11/42 280/47.11 |
| 6,109,626 A | * | 8/2000 | Chapman | B66F 11/048 280/47.11 |
| 6,474,246 B2 | | 11/2002 | Hsu | |
| 6,646,431 B1 | * | 11/2003 | Parvez | G01R 1/06705 73/866.5 |
| 7,481,692 B2 | | 1/2009 | Bruder | |
| 7,998,040 B2 | * | 8/2011 | Kram | A63B 21/055 482/54 |
| 8,157,470 B2 | | 4/2012 | De Wilde | |
| 8,192,105 B2 | | 6/2012 | Keyvanloo | |
| 8,801,491 B2 | | 8/2014 | Bruder | |
| 9,723,920 B1 | | 8/2017 | Wu | |
| 10,933,692 B1 | * | 3/2021 | Smith | B60B 29/002 |
| 2009/0047110 A1 | * | 2/2009 | Wilkie | B66F 9/06 414/592 |
| 2009/0066204 A1 | * | 3/2009 | Reina | A61B 6/06 312/223.1 |
| 2011/0130865 A1 | * | 6/2011 | Setzer, Sr. | B66F 9/08 700/213 |
| 2012/0004081 A1 | * | 1/2012 | Ellis | A63B 21/155 482/97 |
| 2014/0265193 A1 | * | 9/2014 | Stark | F16M 11/045 248/289.11 |
| 2020/0107894 A1 | * | 4/2020 | Wallace | A61B 17/3423 |

OTHER PUBLICATIONS

Written Opinion issued in International Application No. PCT/CA2018/051193, dated Jan. 4, 2019 (4 pages).

Notice of Allowance issued in Canadian Application No. 3,087,381, dated Aug. 20, 2021 (1 page).

* cited by examiner

PULLEY ASSEMBLIES FOR USE IN MODULAR UTILITY SYSTEMS

CROSS-REFERENCE TO RELATED APPLICATION

This application is a division of U.S. patent application Ser. No. 16/678,951 filed on Nov. 28, 2019, which is incorporated herein by reference in its entirety.

TECHNICAL FIELD

The present disclosure relates to modular utility equipment and in particular to modular pulley components for demountable engagement into various configurations of modular assemblies for use in engagement and/or support and/or operation and/or conveyance of equipment for multiple utility purposes.

BACKGROUND

Utility equipment of various forms is used in almost every industry and can range vastly in both size and complexity in order to meet the particular needs of the given industry. The filmmaking industry is one such field requiring various specialized utility equipment. Cinematic techniques in filmmaking, videography, and photography have increased in both scale and complexity. Such cinematic techniques depend on a wide range of utility equipment, in particular camera and lighting support equipment that provide filmmakers with the technical means to create desired camera shots needed for a scene or a cinematographic effect.

Various types of camera motion support equipment are available and are widely used by filmmakers and photographers. Some commonly used equipment include, for example, handheld and body-supported stabilizers and gimbals which allow for a smooth shot to be taken while the operator is walking, while maintaining the ability to control the pan and tilt movements of the camera. Jibs or cranes provide the ability to add vertical and sideways movement to a shot, and the ability to achieve a high angle shot, depending on the size of the jib. Various types of dollies similarly range in size from the very large to smaller systems to provide smooth rolling camera movement thereby enabling the addition of horizontal motion to a shot.

Sliders, for another example, are essentially a condensed, mountable version of a dolly on a supported track and provide smooth movement along a straight horizontal path. For performing a straight up and down vertical tracking movement, however, existing vertical slider or dolly systems are of limited functionality because they have only short vertical ranges of motion.

There are various other industries that have similar problems with equipment availability, materials support, and functionality, such as for example, staging, lighting, and sound support configurations for live events, construction sites, warehousing, and the like.

SUMMARY

The present disclosure generally relates to sturdy and durable pulley system assemblies for use on a work site or other location wherein the assemblies are configured by interconnecting and securely engaging pulley and cable components with a plurality of modular structural support components and with other selected modules configured for mounting and moving of tools or equipment or instruments or materials around a space.

According to some embodiments disclosed herein, the present pulley system assemblies are configured for engaging, lifting, supporting, manipulating, and moving of cameras, lights, microphones, tools, power tools, sensors, or other equipment or devices or materials, and other types of loads along a vertical path using pulley and cable components fastened by eyebolt or other means to a load support subassembly whereby the supported load may be raised and lowered. According to one aspect, the present pulley system assemblies may cooperate with a rail-rolling module engaged with a vertical rail provided therefore, for more precisely controllable raising and lowering of the supported load. According to another aspect, the weight of a load support assembly and supported load thereon may be counterbalanced by an opposing weighted subassembly, which may also cooperate with a rail-rolling module engaged with a vertical rail provided therefore. According to another aspect, modular assemblies comprising the present pulley system assemblies disclosed herein, may additionally have wheel or caster components to provide a transportable rolling movement of the modular assemblies within and about work site.

More specifically, the present disclosure relates to three types of pulley support assemblies configured for demountable engagement with the structural modules of a vertical track system assembly.

An example of an embodiment of the pulley system assemblies disclosed herein pertains to a first type of pulley support assembly which has a pair of opposed pulley modules having an elongate structural element interposed the two pulley modules which are attached to end plates at both ends of the elongate structural element.

Another example of an embodiment of the pulley system assemblies disclosed herein pertains to a second type of pulley support assembly which has a pair of opposed pulley modules that include male end connectors for demountable engagement of the pulley modules with another module of the system with female ends.

Another example of an embodiment of the pulley system assemblies disclosed herein pertains to a third type of pulley support assembly that has a pair of opposed pulley modules wherein the modules' pulley brackets are repositionable to varying angular orientations by alternating screw mount positions selected on mount components at opposite ends of an elongate structural element.

BRIEF DESCRIPTION OF THE DRAWINGS

These and other features of the disclosure will become more apparent in the following detailed description in which reference is made to the appended drawings, wherein.

DETAILED DESCRIPTION

Figure 1:
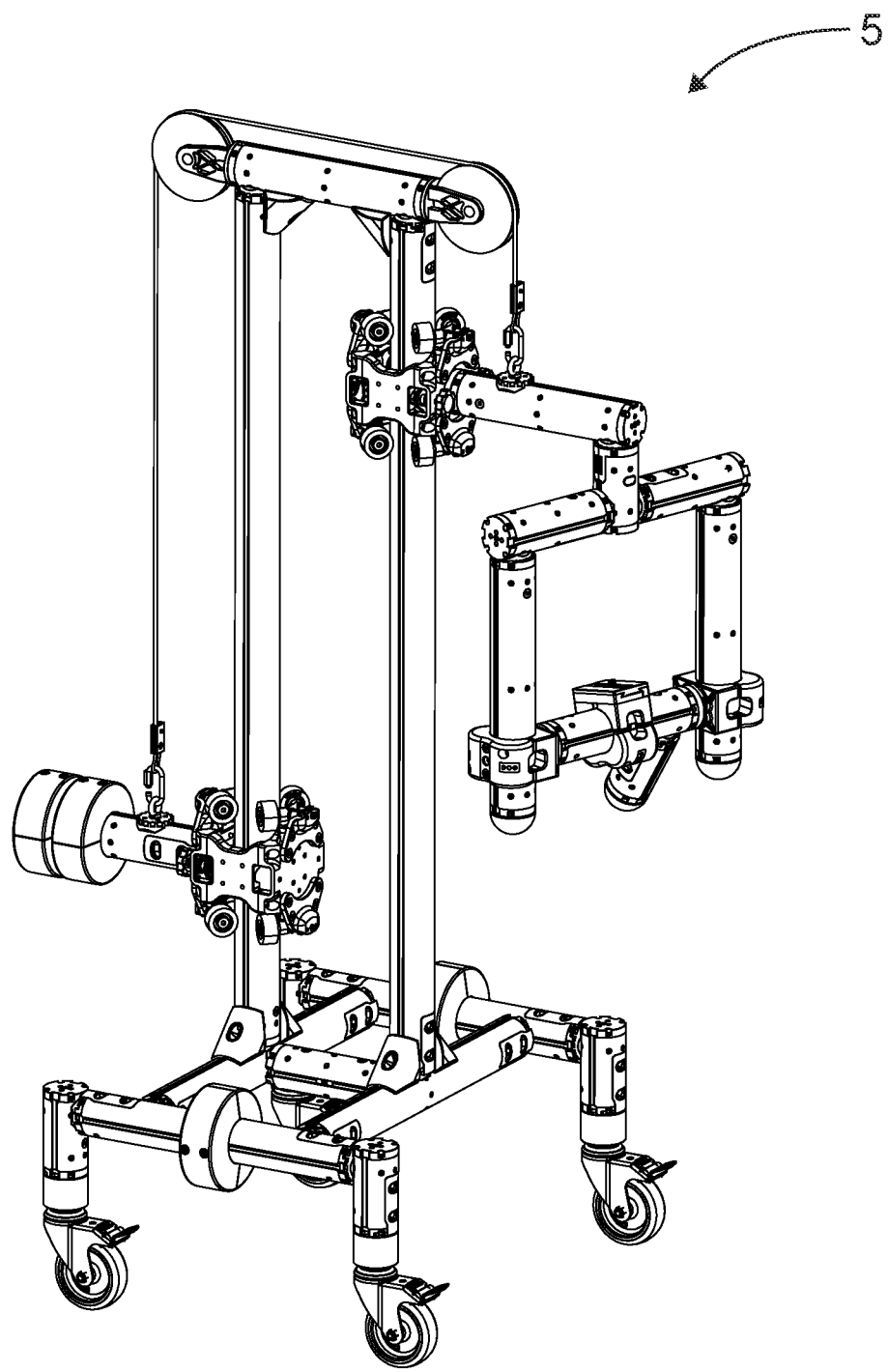
FIG. 1 is a whole perspective view of an example of a counterbalanced vertical track system according to some of the embodiments disclosed herein.

Unless defined otherwise, all technical and scientific terms used herein have the same meaning as commonly understood by one of ordinary skill in the art to which this disclosure relates.

As used herein, the term "about" refers to an approximately +/−10% variation from a given value. It is to be understood that such a variation is always included in any given value provided herein, whether or not it is specifically referred to.

As used herein, the term "perspective view" refers to a three-dimensional view of a component or a module or an assembly disclosed herein that portrays height, width, and depth of the component or module or assembly for a more realistic image and representation.

As used herein, the term "top view" refers to an illustration of a component or a module or an assembly that looks directly down onto the top surface of the component or module or assembly.

As used herein, the term "side view" refers to an illustration of a component or a module or an assembly that looks horizontally and directly at a side of the component or module or assembly.

As used herein, the term "bottom view" refers to an illustration of a component or a module or an assembly that looks directly up at the bottom surface of the component or module or assembly.

As used herein, the term "load support assembly" refers to an assembly having components configured for supporting a camera, a light, a microphone, a tool, a power tool, a sensor, an instrument, a tray, a box, a bucket, a bag, or another such device, or a piece of equipment or a container, for conveyance therealong on a vertical track assembly.

As used herein, the term "vertical rail assembly" refers to an assembly having one or more vertical rail components for retained movement therealong of a load support assembly and/or of a counterbalance assembly where one or both assemblies are demountably engaged with a rail-rolling module travelling on a corresponding vertical rail provided therefor.

As used herein, the term "pulley cross-support assembly" refers to a structural support assembly having two opposed pulleys and a cable fastened to a load at one end and one or more counterweights at the other end for modulated movement of the load.

As used herein, the term "counterbalance assembly" refers to an assembly which is weighted by one or more counterweight components. The counterbalance assembly may be connected by a cable to an opposing load support assembly wherein the cable travels along one or more pulleys interposed the counterbalance assembly and the load support assembly.

As used herein, the term "counterbalanced vertical track assembly" refers to a modular weight support assembly configured for supporting thereon a camera or other device or other load. In some embodiments, the modular weight support assembly may be interconnected by way of a cable running over a pulley cross-support assembly, with an opposing counterbalance assembly provided therefor, such that the modular weight support assembly may be moveable along a vertical rail assembly therefor whereby the opposing counterbalance assembly negates (i.e. balances) the weight of the load support assembly.

As used herein, the term "cart base assembly" refers to a cart chassis assembly supported on wheels or casters for rolling movement on the ground of the cart base assembly and supported vertical track system.

As used herein, the term "tube segment" refers to an elongate structural element having one of a pulley module, a male end, a female end engaged with one or both ends of the elongate structural element. It is optional for the tube segment to have one or more elongate nut channels extending therealong its longitudinal axis. Variously configured elongate structural elements many be used to configure assemblies and subassemblies that incorporate one or more load support subassemblies, vertical rail assemblies, pulley cross-support subassemblies, counterbalance assemblies, counterbalance vertical track assemblies.

As used herein, the term "caster wheel module" refers to a modular assembly having a pivotable wheel, for demountable engagement into a modular assembly to provide a rolling functionality. The wheels may be pneumatic, solid rubber, plastic, or foam.

As used herein, the term "carabiner" refers to a specialized type of shackle comprising a metal loop with a spring-loaded gate for quick and demountable engagement of two or more components.

The embodiments of the present disclosure generally relate to pulley and cable subassemblies that may be used for demountable engagement with the modules disclosed in International Application No. PCT/CA2017/050376 and International Application No. PCT/CA2018/051193 to configure a variety of structural assemblies.

A first embodiment of a pulley cross-support assembly of the present disclosure comprises two of a first example of pulley module demountably engaged with a tube segment via end plates attached to the ends of the tube segment.

A second embodiment of a pulley cross-support assembly of the present disclosure comprises two of a second example of pulley module demountably engaged with male end assemblies for reversible attachment of the pulley modules with modules having female ends.

A third embodiment of a pulley cross-support assembly of the present disclosure comprises two of a third example of pulley module demountably engaged and repositionable on pulley mount components attached at opposing ends of a tube segment.

As disclosed in International Application No. PCT/CA2017/050376 and International Application No. PCT/CA2018/051193, certain elongate structural elements of the system may have one or two male ends for secure demountable engagement with elongate structural elements having one or two female ends demountably engageable with one of the male ends. An elongate structural element's female end may be configured as a "rotator receptacle" or a "joiner receptacle" or a "side-opening receptacle" that is contained within a module's tube segment.

According to one aspect, each of the male ends may comprise a cylindrical body having at least one linear set of prongs or two or more spaced-apart linear sets of prongs about the circumferential surface of the cylindrical body wherein each set of prongs has two or more spaced-apart prongs. According to some aspects, some of the male ends may have two linear sets of prongs spaced apart around the circumference of the cylindrical body, or alternatively, between three and twelve sets of prongs spaced apart around the circumference of the cylindrical body. According to some aspects, each set of prongs may have between one to eight spaced-apart prongs. According to some aspects, some of the male ends may have no prongs.

According to another aspect, each of the female ends may have a cylindrical receptacle for receiving and engaging therein a male cylindrical body. The female receptacle may have at least one linear channel or prong-retaining slot for slidingly receiving and engaging therein the prongs of the male ends. According to some aspects, some of the female ends may have receptacles with two linear channels or prong-retaining slots spaced apart along the length of the receptacle for receiving and engaging therein a male cylindrical body having two linear sets of prongs spaced apart around the circumference of the cylindrical body. Alternatively, some of the female ends may have receptacles with between three to twelve spaced-apart linear channels or prong-retaining slots for slidingly receiving and engaging therein a male cylindrical body having between three to twelve linear sets of prongs spaced apart around the circumference of the cylindrical body. According to another aspect, a female end may have no linear channels or prong-retaining slots for demountably engaging a male cylindrical body of a male end having no prongs. According to another aspect, some of the female ends may be provided with a locking assembly and/or one or more fasteners for demountable engagement therewith one of the male ends.

Figure 2:
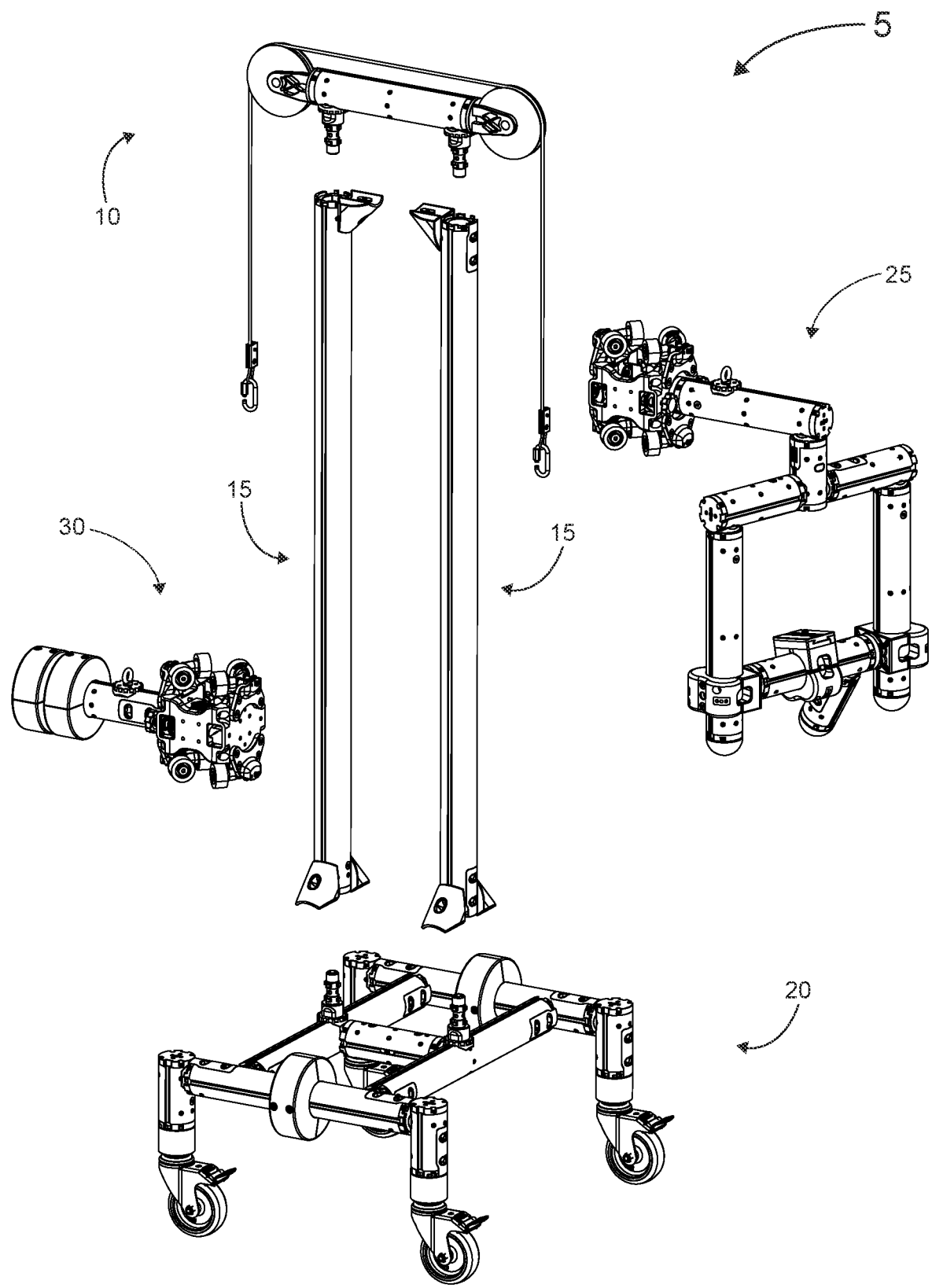
FIG. 2 is a partially exploded perspective view of the counterbalanced vertical track system shown in FIG. 1 comprising a pulley cross-support assembly, two vertical rail assemblies, a cart base assembly, a load support assembly, and a counterbalance assembly.

An example of a counterbalanced vertical track assembly 5 is illustrated in FIGS. 1 and 2 wherein the track assembly 5 generally comprises a first example of a pulley cross-support assembly 10, two vertical rail assemblies 15, a cart base assembly 20, a load support assembly 25, and a counterbalance assembly 30.

Figure 3:
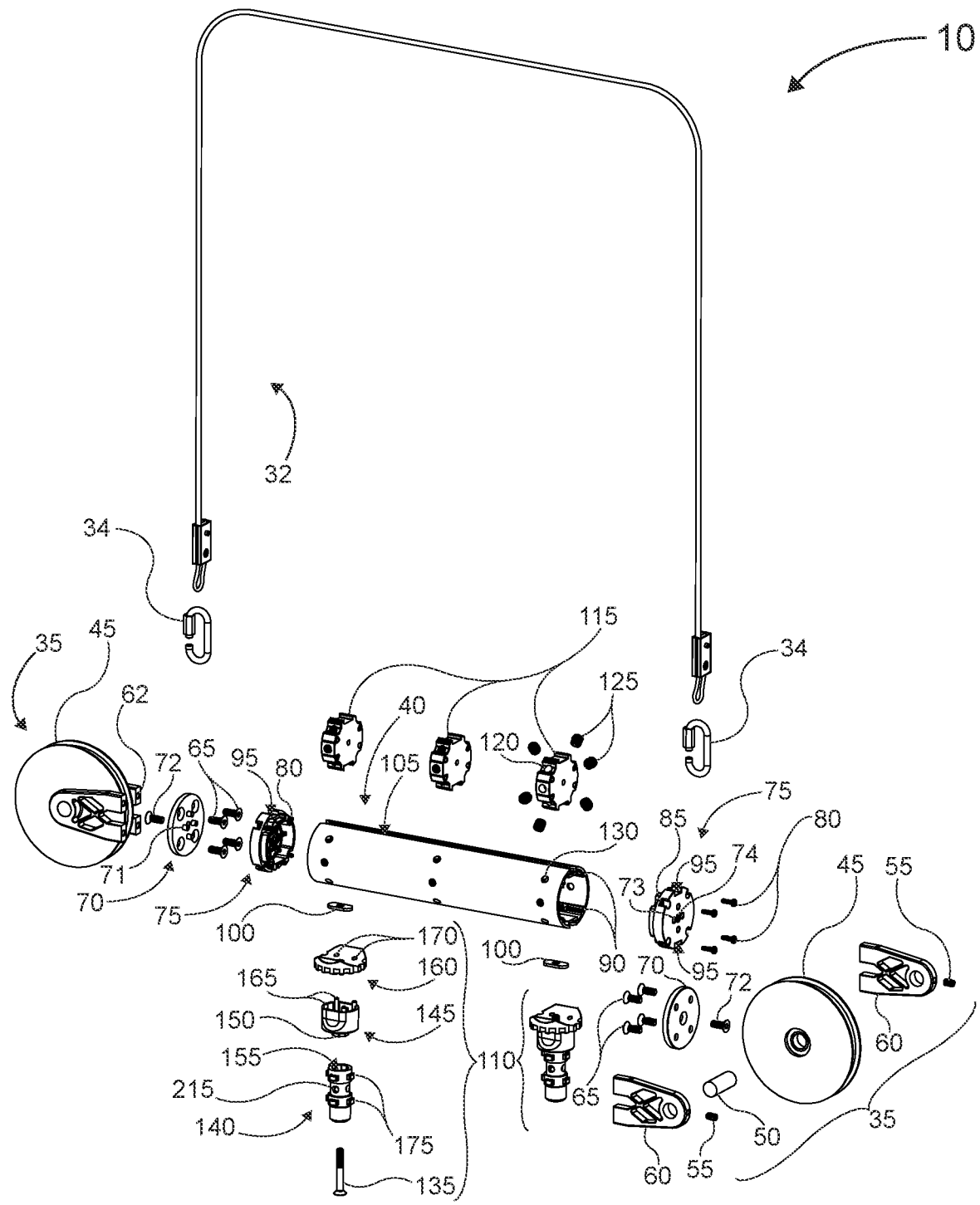
FIG. 3 is an exploded perspective view of a first pulley cross-support assembly shown in FIGS. 1 and 2 on bracket mount plates and flat-mount end-plates.

A first pulley cross-support assembly 10 is illustrated in FIG. 3 wherein the assembly generally comprises a cable with looped ends 32 and carabiners 34 running across two pulley modules 35 demountably engaged at opposing ends of a first example of a tube segment 40. According to one embodiment, a first pulley module generally comprises a pulley 45 rotating around a shaft 50 reversibly fixed by set screws 55 in between two pulley brackets 60. The pulley brackets 60 are mounted at their threaded bores 62 by screws 65 to a bracket mount plate 70 which is demountably engaged by its locator pegs 71 and a screw 72 to locator holes 73 and center threaded bore 74 or threaded insert in a flat-mount end plate 75 fastened to the first tube segment 40 by tube-end screws 80 passed through unthreaded bores 85 for threadable engagement within thread-forming slots 90.

Channel openings 95 in the flat-mount end plate 75 allow for passage of T-nuts 100 into nut channels 105, provided for secure attachment of a male member side-mount assembly 110 or other components along the length of a tube segment. As illustrated in FIG. 3, two male member side-mount assemblies 110 are downwardly engaged with the first tube segment 40 for attachment of the vertical rail assemblies 15, as described in further detail below in reference to FIGS. 4 and 5.

For this same purpose, a tube segment may also have secured within its inner contours, one or more tube-middle threaded insert mounts 115 comprising a plurality of threaded insert holes 120 wherein threaded inserts 125 may be provided for attachment of additional male member side-mount assemblies 110 or other components (not shown) by a bolt or screw passed through side-mount bores 130 for threadable engagement with a corresponding threaded insert 125. A tube-middle threaded insert mount 115 may be securely fixed in place within a tube segment by a set screw or alternatively, by use of a polymeric adhesive or brazing or crush ribs, and the like.

As illustrated in FIG. 3, two male member side-mount assemblies 110 are demountably engaged by a screw or bolt with each a T-nut 100 thereby secured within the downward-facing nut channel 105. According to one embodiment, a male member side-mount assembly 110 comprises a bolt 135 passed through the center of a male component 140 secured against a wide pivot component 145 at an octagonal boss 150 engaged within an octagonal recess 155 in the proximal end of the male component 140. The wide pivot component 145 is engaged next with a concave mount component 160 where they are held together by the bolt 135 and locator teeth 165 on the wide pivot component 145 inserted into locator holes 170 in the corresponding face of the concave mount component 160.

As disclosed in International Application No. PCT/CA2017/050376 and International Application No. PCT/CA2018/051193, certain modules of the system may include male ends for secure demountable engagement of the modules with other modules of the system having cooperating female ends. One such example is the male member side-mount assembly 110 with male component 140 comprising four linear sets of prongs 175 positioned around the circumferential surface of the male component provided for mating engagement of the male assembly with a corresponding female end.

Figure 4:
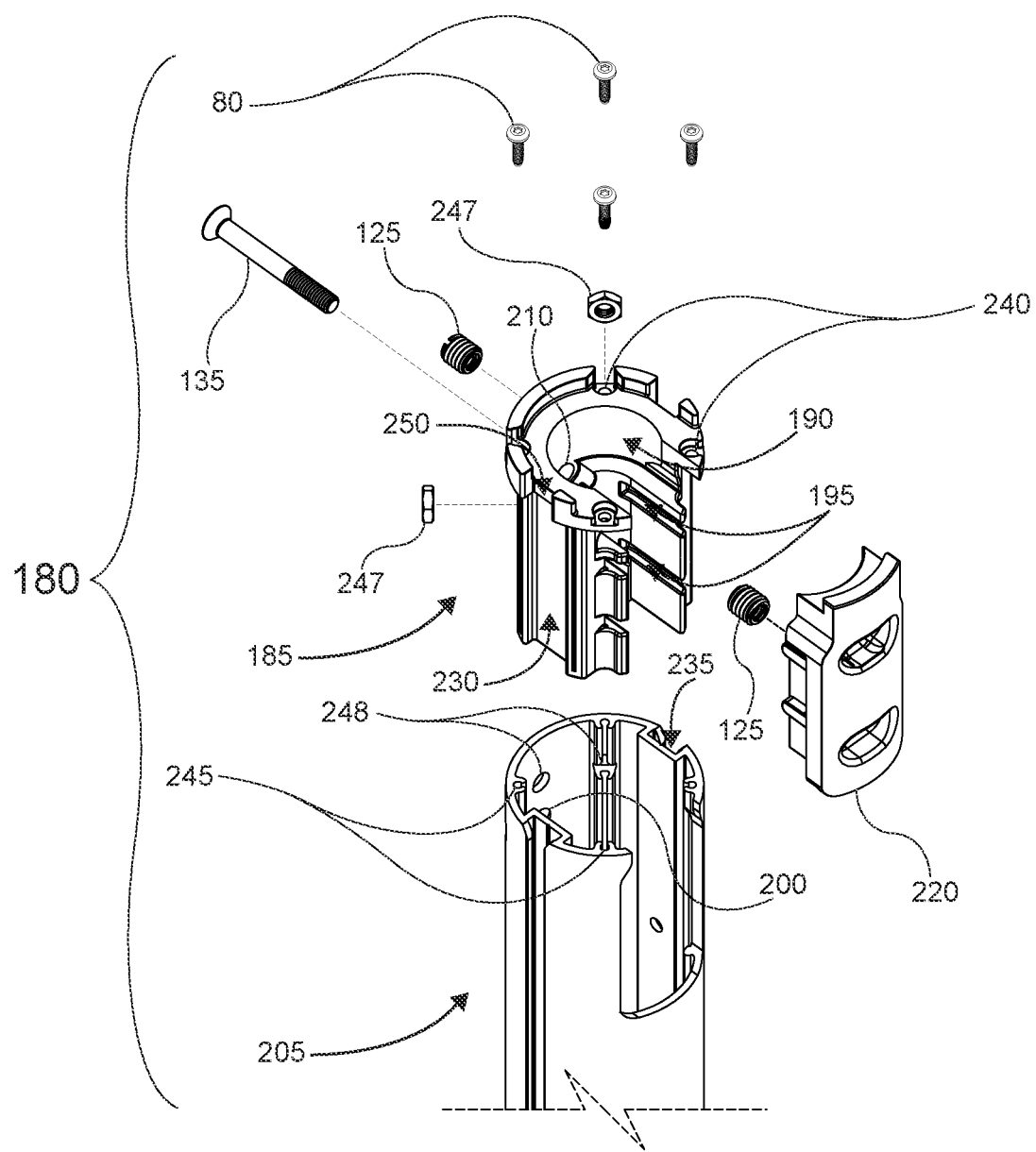
FIG. 4 is an exploded perspective view of a female end and side-opening receptacle socket of some of the structural modules disclosed herein.

FIG. 4 illustrates a first example of a female end 180 of the modular system of the present disclosure, and related applications, comprising a side-opening receptacle socket 185. The side-opening receptacle socket 185 may comprise cooperatively-shaped male member channels 190 and prong-retaining slots 195 which securely engage the outer contours of an inserted male end assembly. Once inserted, male assembly 110 may be fixed within the side-opening receptacle by a bolt 135 passed through a tube bore 200 in a second example of a tube segment 205, an unthreaded bore 210 in the side of the receptacle socket 185, and through an unthreaded bore 215 in the male component 140 (as indicated, for example, in FIG. 3) to be threadably engaged at a threaded insert 125 located centrally in the proximal side of a side-opening receptacle cover 220, which locks together the cooperating modules until the bolt 135 is removed. The side-opening receptacle cover 220 may also comprise prong-retaining slots 225 (shown in FIG. 5) for matingly engaging a corresponding linear set of prongs 175 of a secured male end assembly.

Side-opening receptacle socket 185 additionally comprises side channels 230 wherein it is slid into the corresponding end of the tube segment 205 against the inward-facing edges of the nut channels 235, where it is secured by tube-end screws 80 passed through unthreaded bores 240 in the socket 185 to be threadably engaged within thread-forming slots 245 on the inner contours of the tube segment 205.

According to some embodiments, the outer contours of the side-opening receptacle socket 185 may provide bores or slots for one or more threaded inserts 125 or hex nuts 247 to be secured when assembled within a tube segment 205 where provided therefor are one or more side-mount bores 248 through which a screw or a bolt 135 may secure additional male member side-mount assemblies 110 or other component as disclosed in International Application No. PCT/CA2017/050376 and International Application No. PCT/CA2018/051193. Additional male member assemblies may also be secured along the side of the tube segment 205 by a bolt threadably engaged with a T-nut 100 passed through the socket's channel openings 250 into the nut channels 235, and therein secured.

Figure 5:
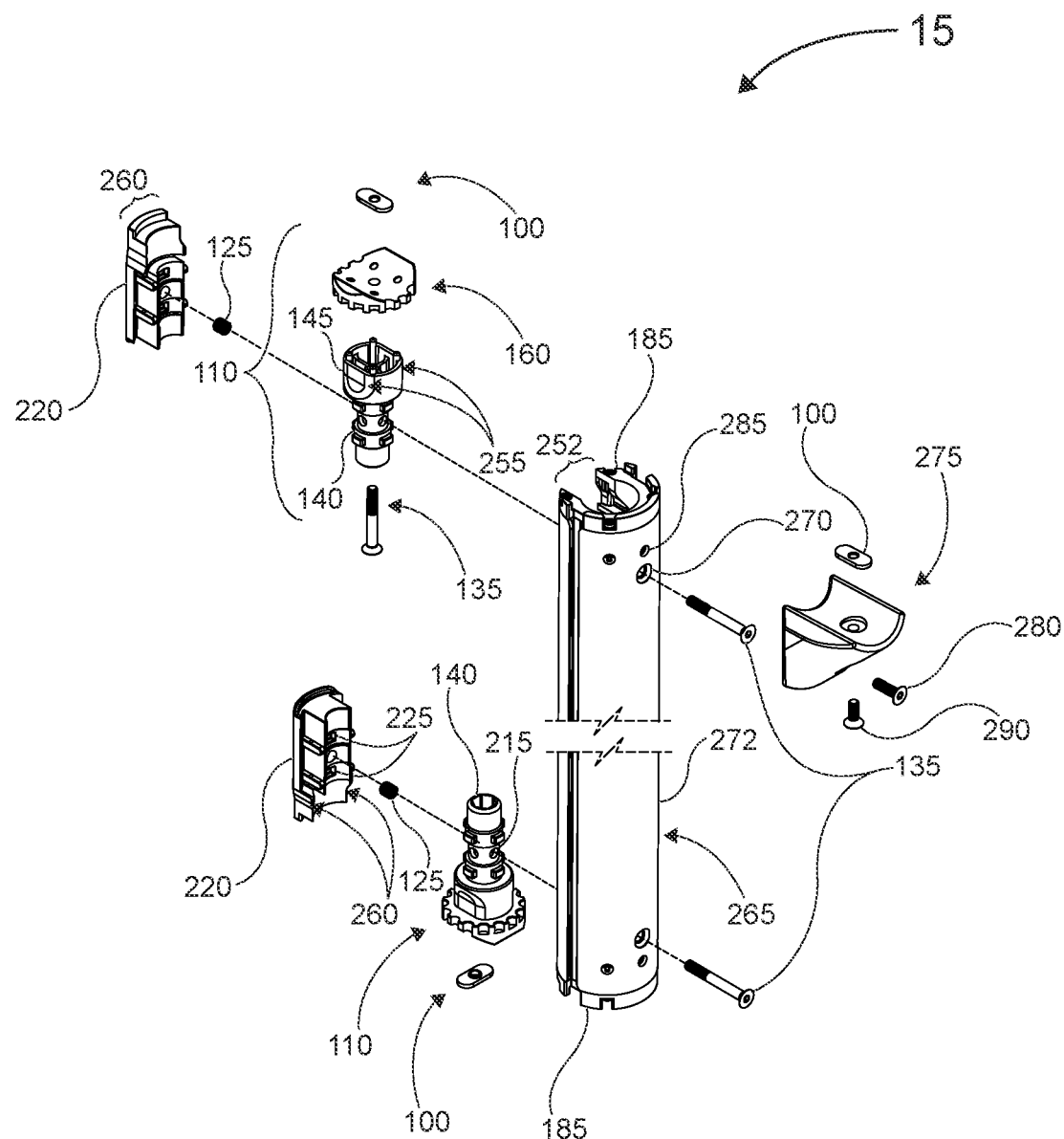
FIG. 5 is a partially exploded perspective view of a vertical rail assembly with a corner brace according to some of the embodiments disclosed herein.

Described in reference to FIG. 5, according to a preferred embodiment of female ends and male end assemblies of the system as presently disclosed and disclosed in International Application No. PCT/CA2017/050376 and International Application No. PCT/CA2018/051193, the sideway opening of the receptacle sockets 185 and corresponding tube segments (as shown in FIG. 5, for example, illustrating one of the vertical rail assemblies 15 of the vertical track system 5) comprise a narrow end 252 for demountable engagement of the male assembly 110 in alignment with indents 255 on two sides of the assembly's wide pivot component 145.

The side-opening receptacle cover 220 also comprises indents 260 for mating engagement with the narrow end 252, to therefore securely engage itself, an inserted male assembly, and optionally the receptacle socket 185 where tube-end screws 80 are optionally not installed as previously described, allowing for all three components to be demounted from the corresponding tube segment until a bolt 135 is inserted.

As illustrated in FIG. 5, a vertical rail assembly 15 may comprise a first example of a double-receptacle side-opening module 265 wherein at each end a male member side-mount assembly 110 of the first pulley cross-support assembly 10 and the cart base assembly 20 (not shown) are securely held when bolts 135 are passed through tube bores 270 of a third example of a tube segment 272, and the unthreaded bore 210 (shown in FIG. 4) in the side of the receptacle socket 185, and the unthreaded bore 215 in the male component 140, and then threadably engaged with a threaded bore or threaded insert 125 in the cover 220.

For further reinforcement and stability, a vertical rail assembly 15 may comprise, at one or both ends, corner braces 275 having two concave faces for fitted engagement with the side-opening module 265 and the corresponding perpendicular tube segment of the first pulley cross-support assembly 10 and the cart base assembly 20. As configured in FIG. 5, the corner brace 275 is securely attached to the side-opening module 265 by a screw 280 passed through the corner brace and the side-mount bore 285 and there threadably engaged with the threaded insert 125 provided in the side of the receptacle socket 185. A second screw 290 is threadably engaged with a T-nut 100 held in the nut channel of the intersecting module's tube segment.

Figure 6A:
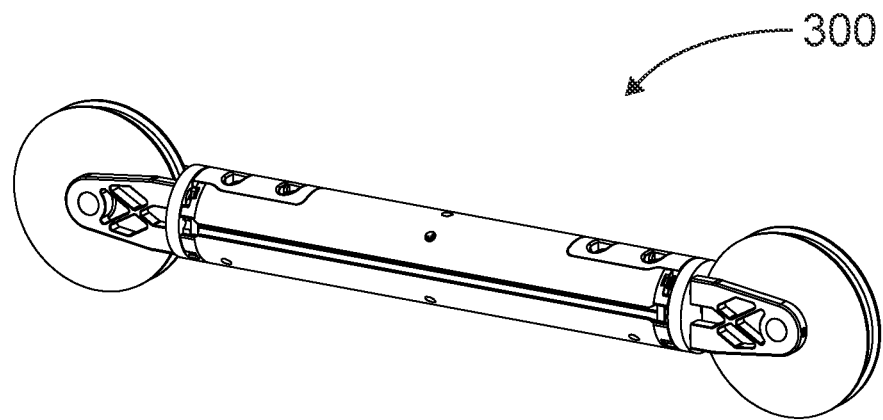
FIGS. 6A and 6B are whole and partially exploded perspective views of a second pulley cross-support assembly with spacer plates and male ends according to some of the embodiments disclosed herein.
Figure 6B:
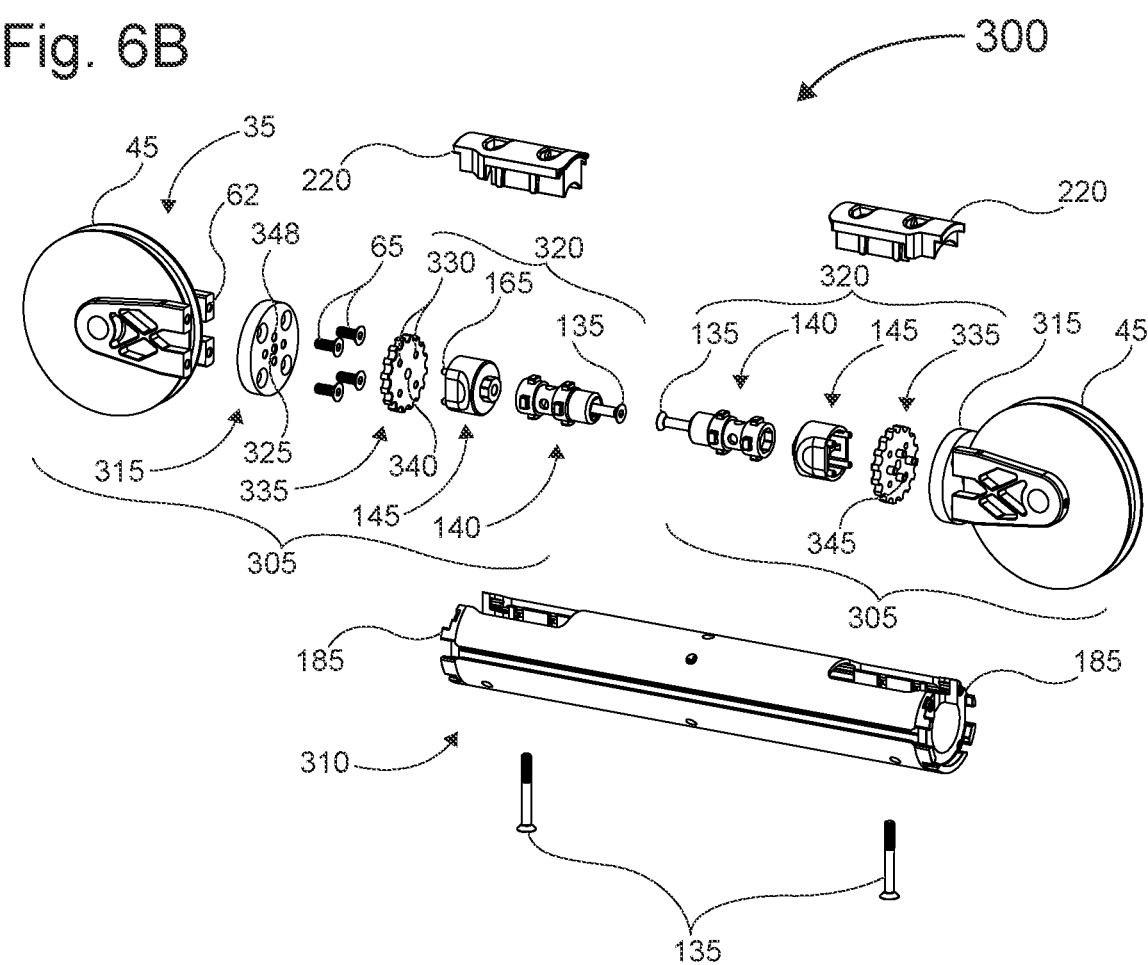

As illustrated in FIG. 6, a modular assembly (as presently disclosed and disclosed in International Application No. PCT/CA2017/050376 and International Application No. PCT/CA2018/051193) may comprise one or more of a second example of a pulley cross-support assembly 300 across which a running cable is supported on pulleys 45 to move a corresponding load such as a camera, a light, a microphone, a tool, a power tool, a sensor, a tray, a box, a bucket, a bag, another device, or a piece of equipment or a container. According to one embodiment, the assembly 300 may comprise two male pulley assemblies 305 wherein each is secured by a bolt 135 into a receptacle socket 185 at each end of a second a double-receptacle side-opening module 310.

A male pulley assembly 305 may comprise the pulley module 35, as previously described in reference to FIG. 3, here mounted to a male spacer plate 315 by screws 65 passed through holes in the spacer plate to be threadably engaged with the pulley module's threaded bores 62.

Each of the male pulley assemblies 305 additionally comprises a male member flat-mount assembly 320 for secure engagement with the side-opening module 310 or another module of the system having a female end as presently disclosed and as disclosed in International Application No. PCT/CA2017/050376 and International Application No. PCT/CA2018/051193. The male member flat-mount assembly 320 is secured to the male spacer plate 315 by a bolt 135 threadably engaged with a center threaded bore 325 or threaded insert located at the center of the male spacer plate 315. The male member flat-mount assembly 305 is assembled by the bolt 135 passed through the center of the male component 140 and wide pivot component 145, as previously described in reference to FIG. 3, but here securing the wide pivot component 145 by its locator teeth 165 at locator holes 330 in a flat mount component 335 additionally comprising a center through-hole 340 where the bolt 135 is passed through to be threadably engaged with the center threaded bore 325 of the male spacer plate 315 whereon the male assembly 320 is therefore securely engaged by the bolt and locator pegs 345 at locator holes 348 in the corresponding face of the male spacer plate 315.

Figure 7A:
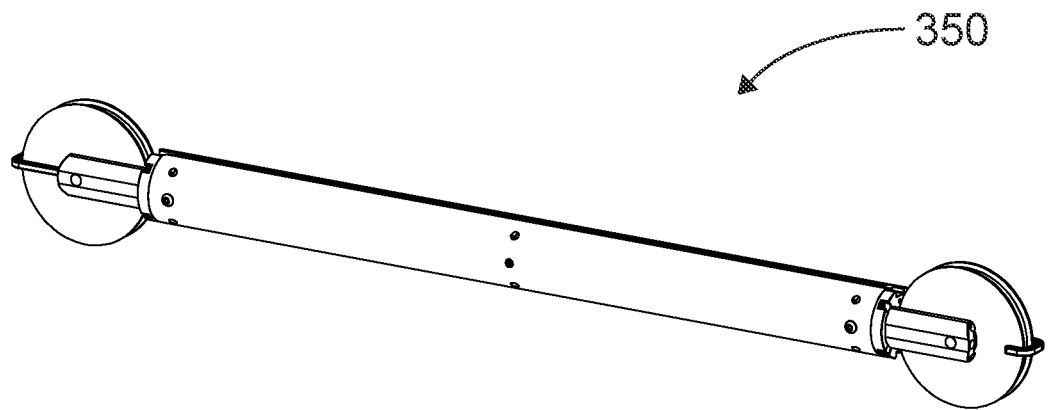
FIGS. 7A and 7B are whole and partially exploded perspective views of a third pulley cross-support assembly with repositionable pulley assemblies according to some of the embodiments disclosed herein.
Figure 7B:
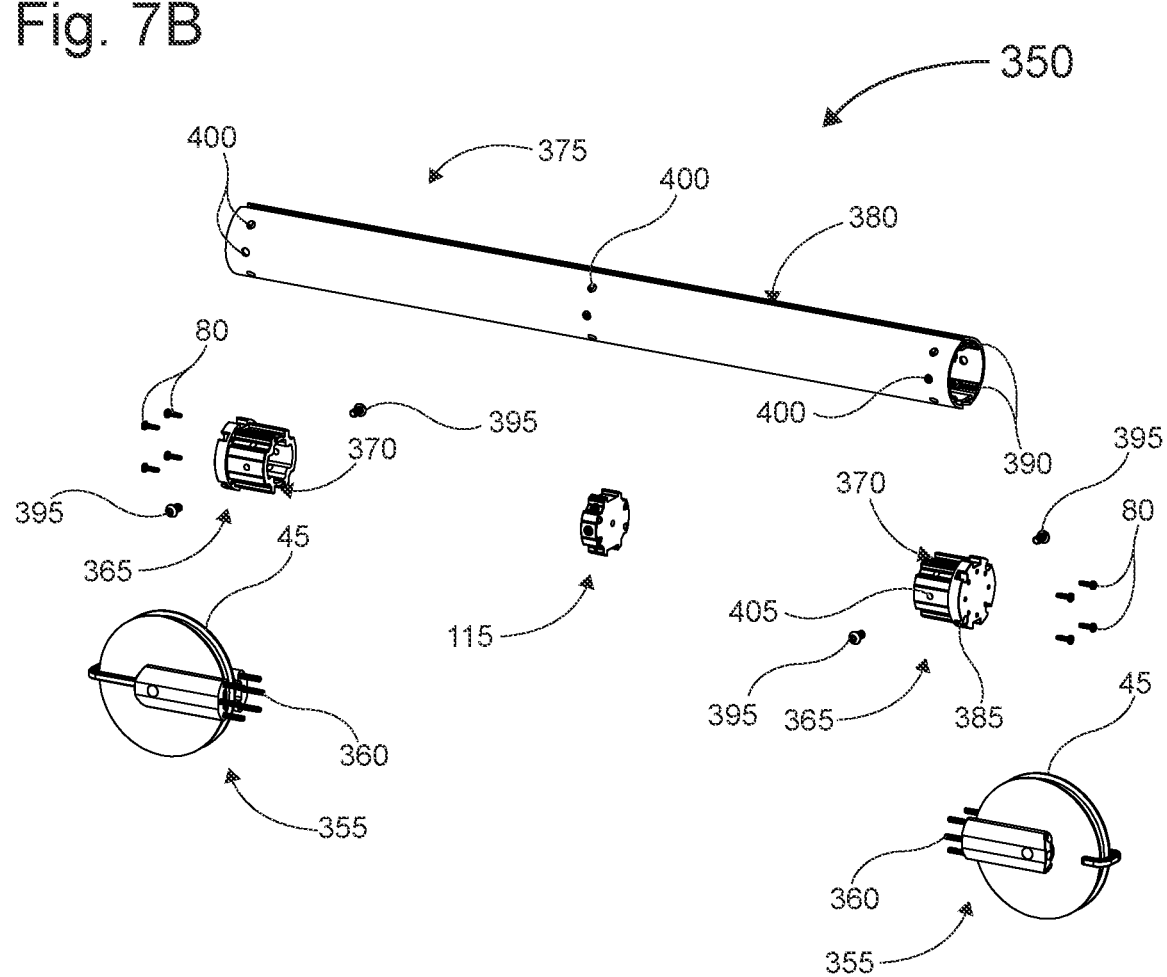
Figure 8:
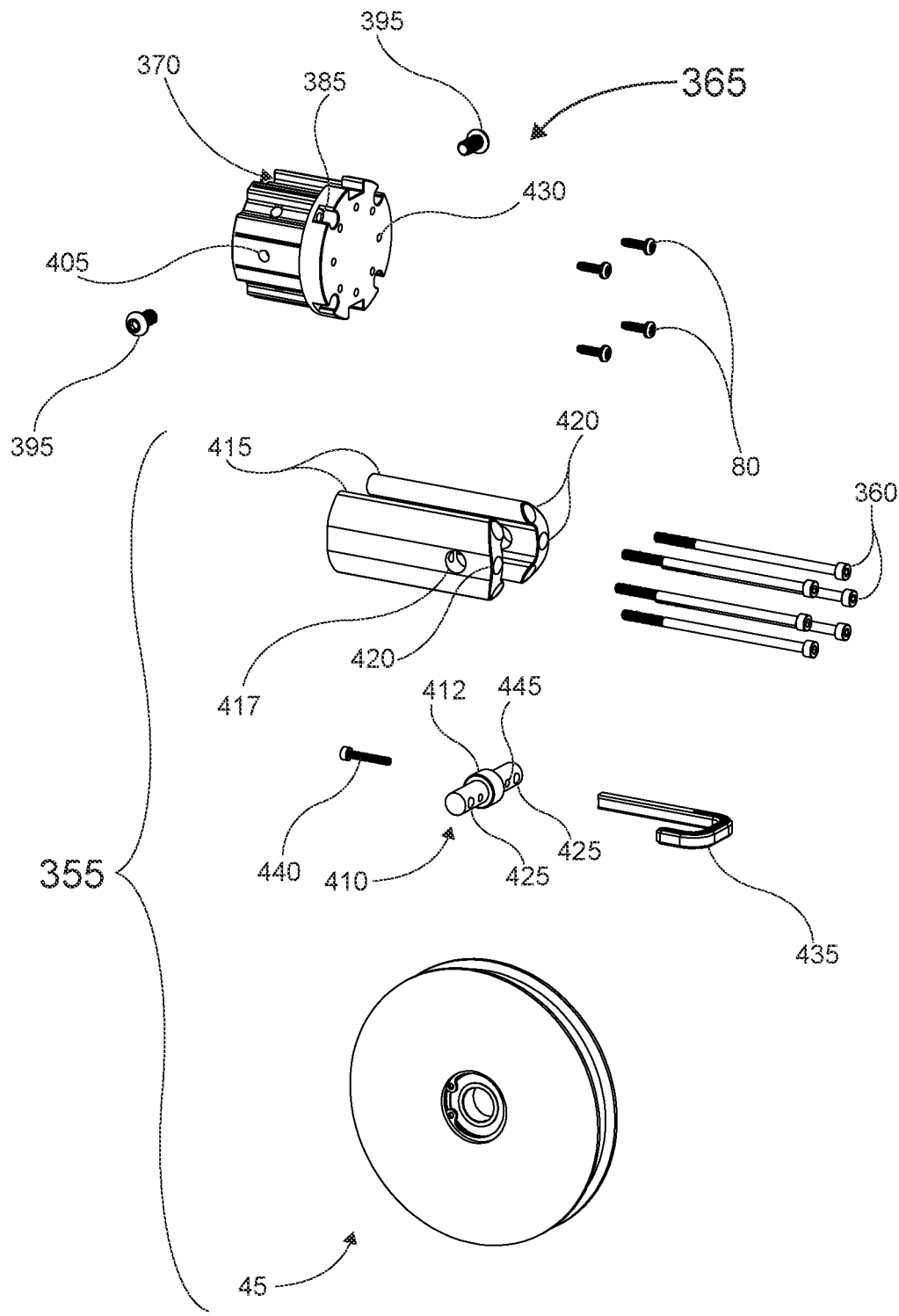
FIG. 8 is an exploded perspective view of the pulley mount component and the repositionable pulley assembly shown in FIGS. 7A and 7B.

As illustrated in FIGS. 7 and 8, the modular system (as presently disclosed and disclosed in International Application No. PCT/CA2017/050376 and International Application No. PCT/CA2018/051193) may comprise one or more of a third example of a pulley cross-support assembly 350 across which a running cable is supported on pulleys 45 to move a corresponding load such as a camera, a light, a microphone, a tool, a power tool, a sensor, a tray, a box, a bucket, a bag, an other device, or a piece of equipment or a container. According to one embodiment, the assembly 350 comprises two repositionable pulley assemblies 355 each secured by bolts 360 to a pulley mount component 365.

A pulley mount component 365 may comprise side channels 370 wherein the pulley mount 365 is slid into a corresponding end of a fourth example of a tube segment 375 against the inward-facing edges of the nut channels 380, where the pulley mount 365 is secured by tube-end screws 80 passed through unthreaded bores 385 in the pulley mount component 365 to be threadably engaged within thread-forming slots 390 on the inner contours of the fourth tube segment 375. Alternatively, or in addition to the tube-end screws, a pulley mount component 365 may be secured within a tube segment 375 by side-mount screws 395 passed through side-mount bores 400 to be threadably engaged with threaded bores 405 or threaded inserts in the outer contours of the mount component.

When not occupied by side-mount screws 395, the threaded bores 405 may also be used to securely engage a male member side-mount assembly 110, as previously described. For this same purpose, the pulley cross-support assembly 350 may also have secured within its inner contours, one or more of the tube-middle threaded insert mounts 115, as previously described. Additionally, side-mount assemblies 110 may be secured to the tube segment 375 by a T-nut held within the nut channels 380.

As illustrated in FIG. 8, according to a preferred embodiment, a repositionable pulley assembly 355 comprises a pulley 45 rotating on a pulley shaft 410 to which it is adhered at a wide mid-section 412. The pulley shaft 410 is set between two repositionable pulley brackets 415 in holes 417 by two of bolts 360 passed through holes 420 in the brackets and through-holes 425 in the pulley shaft to be threadably engaged with two of eight of threaded bores 430 in the pulley mount component 365. For further reinforcement, additional bolts 360 may be threadably engaged with additional threaded bores 430. The angular orientation of the repositionable pulley brackets 415 and pulley 45 is incrementally variable relative to the supporting assembly by changing the selection of the threaded bores 430 at which the bolts 360 are threadably engaged.

To prevent disengagement of a system assembly's cable from a pulley cross-support assembly 350, a repositionable pulley assembly 355 may additionally comprise a cable-retaining component 435 demountably engaged by a retaining screw 440 passed through one of two holes 445 through the pulley shaft 410 to be threadably engaged with a threaded bore in the proximal end of the cable-retaining component 435.

Figure 9:
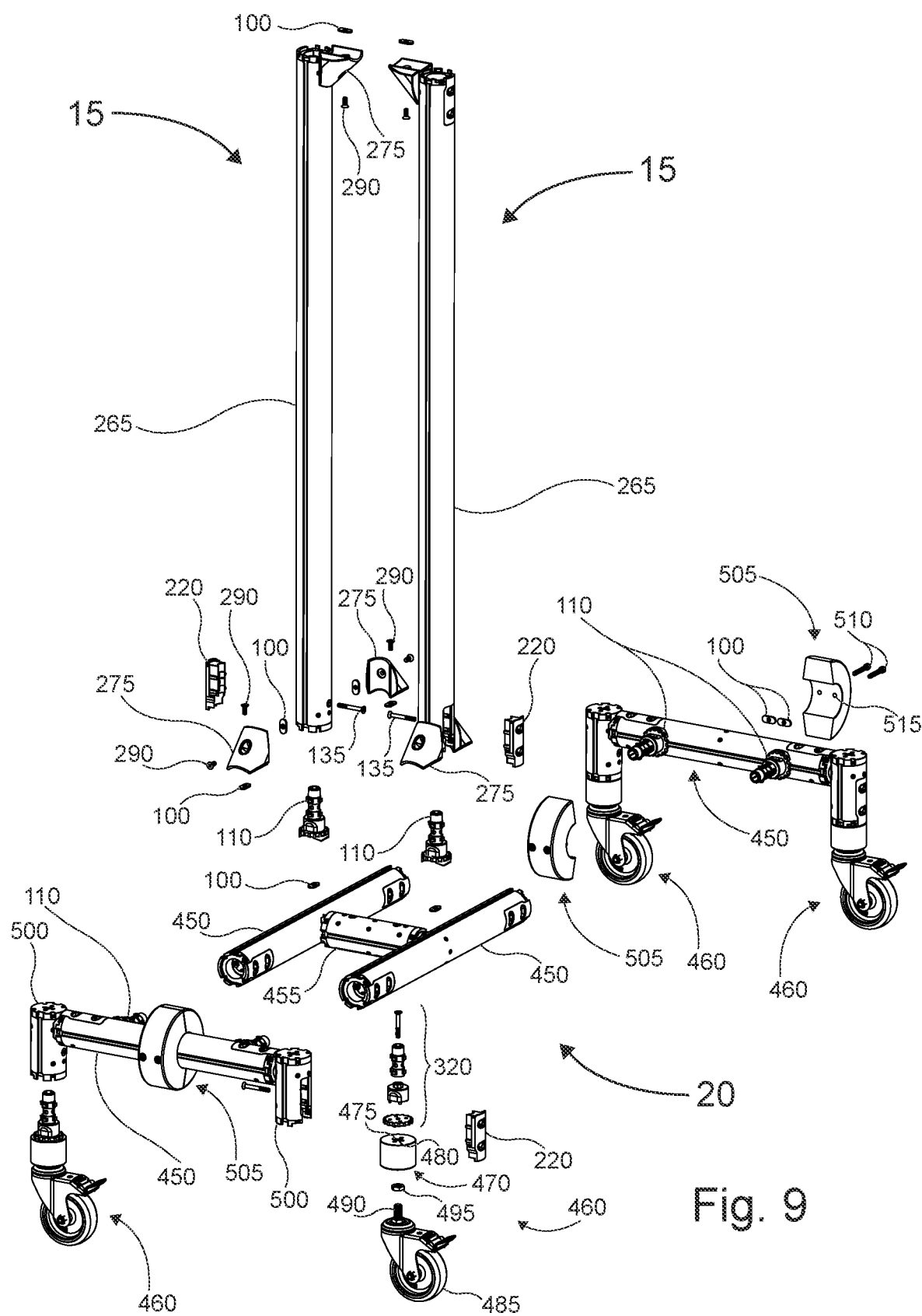
FIG. 9 is a partially exploded perspective view of the vertical rail assemblies and cart base assembly shown in FIG. 1.

As illustrated in FIG. 9, a vertical track system 5 may comprise various sizes and configurations of vertical rail assemblies and cart base assemblies. As previously described in reference to FIG. 5, the side-opening modules 265 of the vertical rail assemblies 15 are securely fastened at the top to a pulley cross-support assembly by male member side-mount assemblies 110 and corner braces 275. In the same way, the bottom ends of the vertical rail assemblies 15 are securely engaged by T-nuts 100 within the nut channels of the corresponding modules of the cart base assembly 20.

The cart base assembly 20 may comprise a third length of double-receptacle side-opening module 450 connected centrally by a fourth length of double-receptacle side-opening module 455 on two male member side-mount assemblies 110. The vertical rail assemblies 15 are there fastened to the cart base assembly 20 by the side-mount assemblies 110 and corner braces 275 securely engaged by screws or bolts with T-nuts 100 held within the upwardly facing nut channels of the side-opening modules 450.

The cart base assembly 20 provides a rollable base on which the vertical track assembly 5 is movable by pushing or pulling the utility cart in any direction on the four 360° pivotable caster wheel modules 460. Alternatively, in place of wheel modules, similar assemblies may be configured with other modules of the system at its base for standing assemblies, such as foot modules "580", "585", "590" or end-cap components "680" shown in FIGS. 24, 25, and 33 of International Application No. PCT/CA2017/050376, or end-caps 465 of the present disclosure described in further detail below in reference to FIG. 10.

The cart base assembly 20 may comprise four caster wheel modules 460 each comprising a male member flat-mount assembly 320 secured to the top-face of a threaded mount component 470. The male member flat-mount assembly 320 is first aligned against the top-face of the threaded mount component 470 by locator pegs 345 on the bottom of the flat mount component 335, as described previously in reference to FIG. 6, here inserted into locator holes 475 in the top-face of the mount component 470 where, with a bolt passed through the center of the male assembly 320 and threadably engaged with the center threaded bore 480 or threaded insert located at the center of the mount component 470, the male assembly 320 is demountably secured. A castor wheel 485 is rotationally engaged with the threaded mount component 470 by mount screw 490 and lock nut 495 or other means of attachment with the underside of the mount component 470.

The four caster wheel modules 460 are demountably engaged with four of a first length of single-receptacle side-opening module 500 connected centrally by two more of side-opening modules 450 which are connected by male side-mount assemblies 110 to the central rail supporting side-opening modules 450.

For added stability of the vertical track assembly 5 and supported camera or other device or load, a cart base assembly 20 may additionally comprise one or more counterweight components 505 as disclosed in International Application No. PCT/CA2017/050376 and shown in FIG. 9 mounted by screws 510 passed through holes 515 in the counterweight components 505 to be threadably engaged by T-nuts 100 securely held within the nut channels of the side-opening modules 450.

Figure 10:
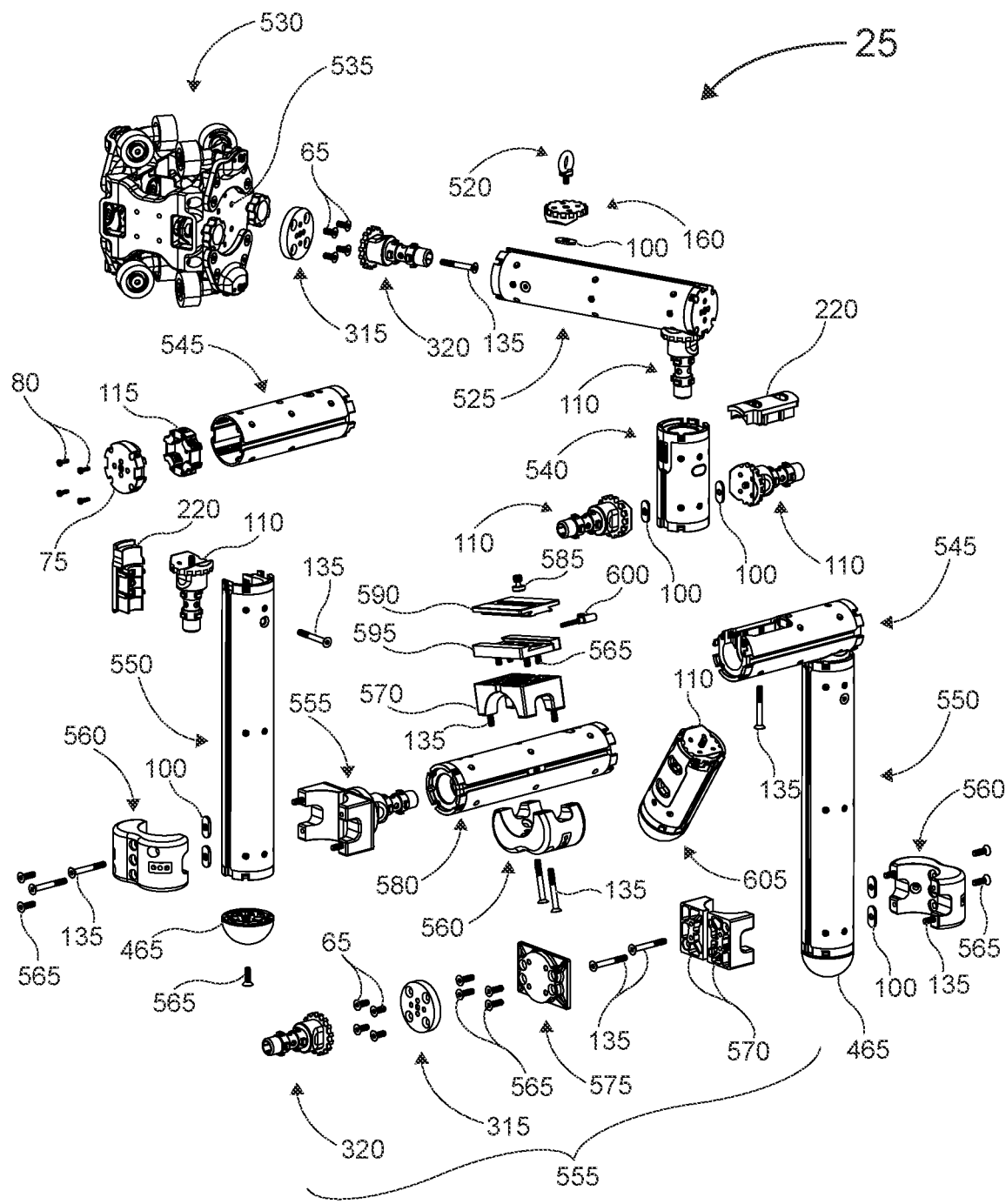
FIG. 10 is a partially exploded perspective view of the load support assembly shown in FIGS. 1 and 2 with a rail-rolling module.
Figure 11:
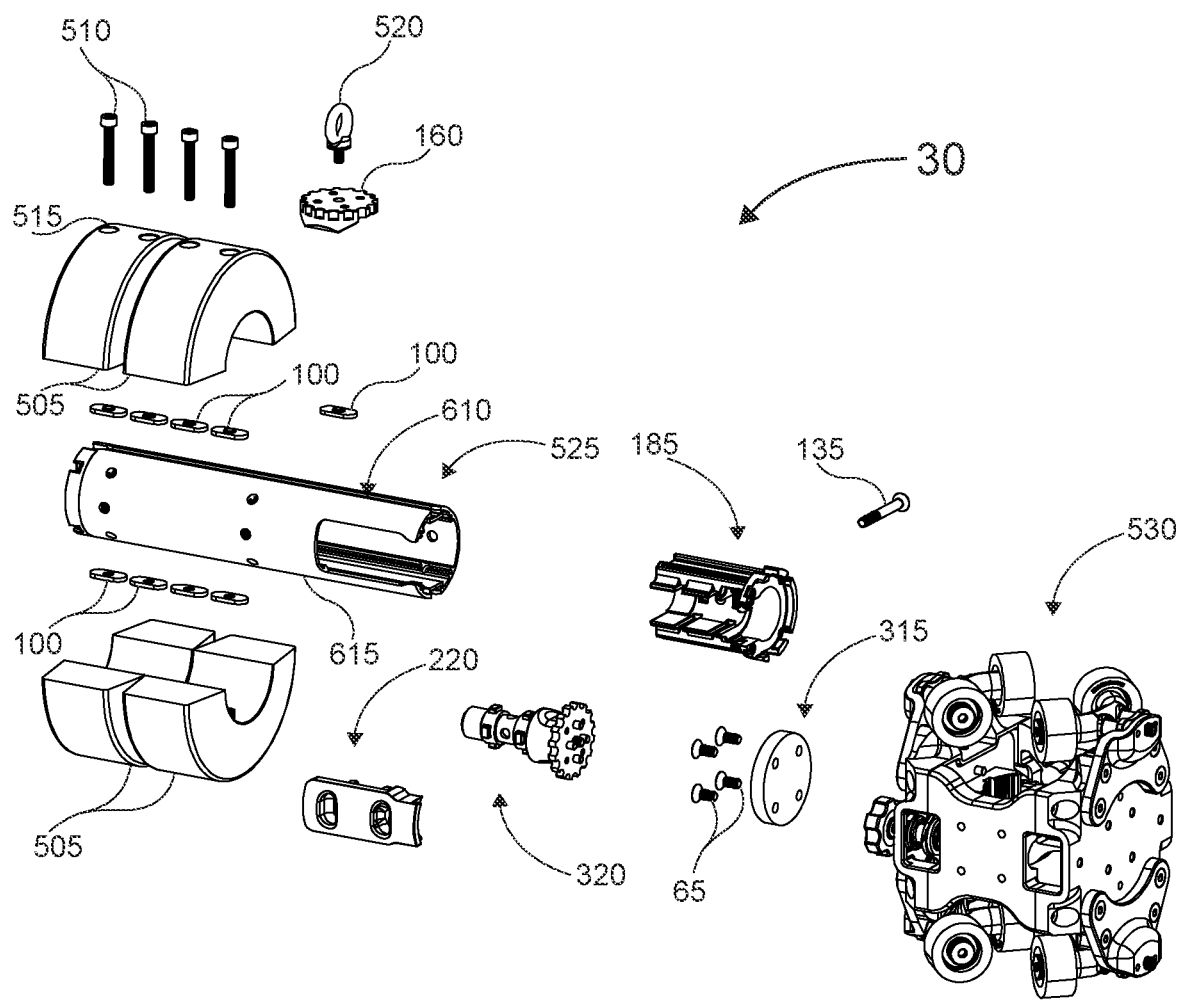
FIG. 11 is a partially exploded perspective view of the counterbalance assembly shown in FIGS. 1 and 2 with a rail-rolling module and counterweights.
Figures 12A, 12B:
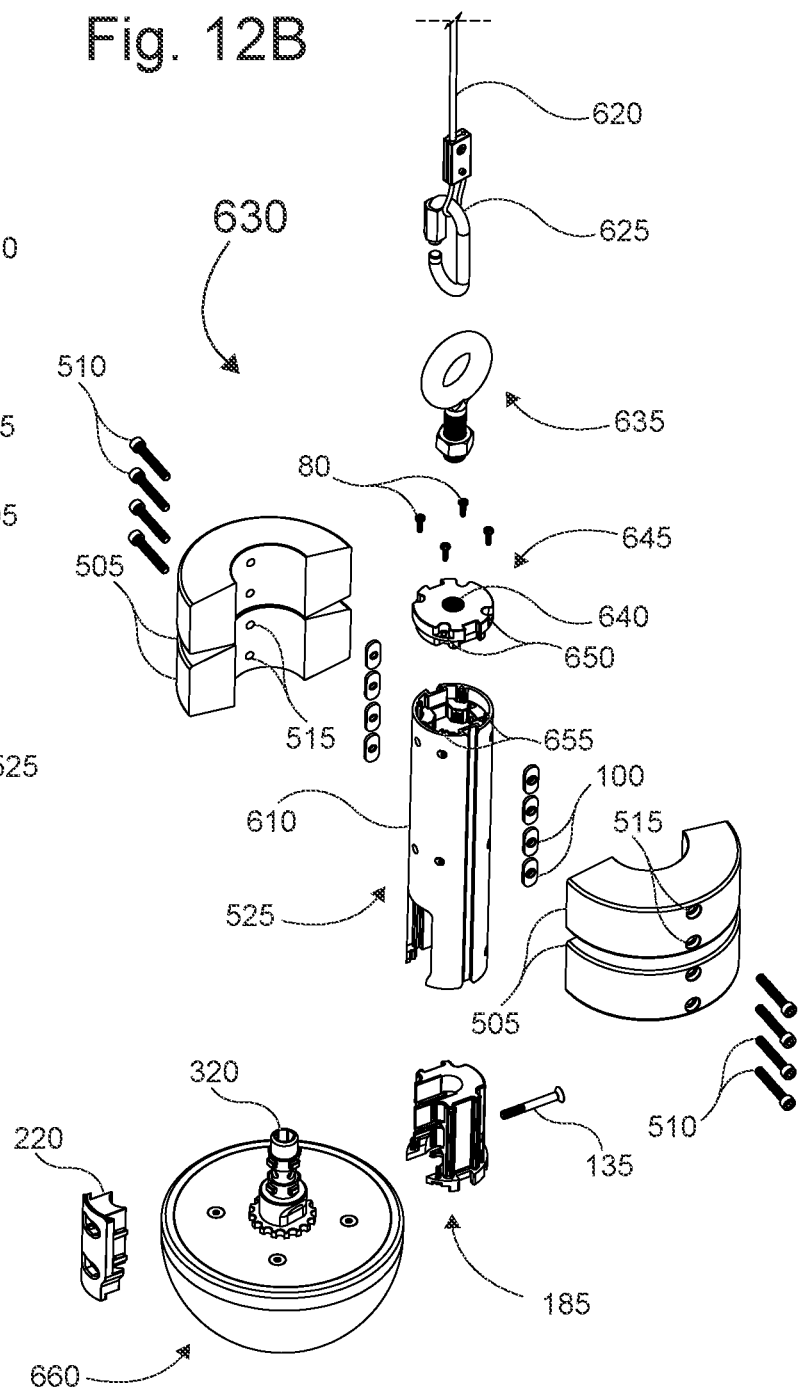
FIGS. 12A and 12B are whole and partially exploded perspective views of a tube-end eyebolt assembly.

As illustrated in FIG. 10, a modular assembly (as presently disclosed and disclosed in International Application No. PCT/CA2017/050376 and International Application No. PCT/CA2018/051193) may additionally comprise a load support assembly on which a camera, a light, a microphone, a tool, a power tool, a sensor another device or a load may be positioned and moved along a vertical rail assembly with its weight transferred across a pulley cross-support assembly by a cable and negated by a counterbalance assembly as described in further detail below in reference to FIGS. 11 and 12.

A vertical track system 5 may comprise the load support assembly 25 suspended from the cable with looped ends 32 and a carabiner 34, as shown in FIG. 3, to an eyebolt 520 securely engaged with the side of a second length of single-receptacle side-opening module 525 by a concave mount component 160 and a T-nut 100 securely held in the top-facing nut channel of the side-opening module 525.

For controlled vertical movement of a load support assembly and supported load, the assembly 25 may be retained and is moveable on a vertical rail assembly by a rail-rolling module 530 such as the rail-rolling modules previously disclosed in International Application No. PCT/CA2017/050376. The cable-suspended side-opening module 525 is demountably engaged with a side of the rail-rolling module 530 via a male member flat-mount assembly 320 and male spacer plate 315 mounted by screws 65 to the side of the rail-rolling module at threaded bores 535.

For panning and tilting movement of a supported camera or other device on the load support assembly 25, a box-shaped assembly as shown in FIG. 10 may be configured from additional modules of the system as presently disclosed and disclosed in International Application No. PCT/CA2017/050376 and International Application No. PCT/CA2018/051193. Attached downward from the single-receptacle side-opening module 525 is a single-receptacle rotator module 540 which may be locked or rotated 360-degrees on the male side-mount assembly 110, as described in further detail in International Application No. PCT/CA2017/050376. Two of a third length of single-receptacle side-opening module 545 are demountably engaged on side-mount assemblies 110 held by T-nuts 100 in the nut channels of the rotator module 540. Downward from the side-opening modules 545, two of a fourth length of single-receptacle side-opening module 550 are attached via side-mount bores and tube-middle threaded insert mounts 115 of modules 545.

Attached inwardly from the two side-opening modules 550 are two of a male bracket assembly 555 which are repositionable along the side-opening modules 550 where secured by two out-facing multi-angle mount brackets 560 secured by screws 565 to T-nuts 100 or by the clamping force applied by bolts 135 pulling the concave shaped components firmly in against the side of the corresponding tube segments. The in-facing male bracket assemblies 555 comprise plate wedges 570 having fastened thereon by screws 565 a bracket mount plate 575, and thereon by screws 65 a male mount spacer plate 315 from which two in-facing male flat-mount assemblies 320 are provided for locked or 360-degree pivotable connection of a double-receptacle rotator module 580.

A camera or other device is tiltable on the double-receptacle rotator module 580 where connected by a mount-screw 585 to a dovetail plate 590 which is demountably secured within a dovetail mount assembly 595 by tension applied by a screw knob 600. The dovetail mount assembly is attached by screws 565 to the two additional plate wedges 570 which are positionable and secured against the rotator module 580 by the clamping force applied by a down-facing multi-angle mount bracket 560 engaged with the plate wedges by bolts 135.

A load support assembly 25 may additionally comprise an operating handle assembly 605 mounted to the side of rotator module 580 or another module of the support assembly 25. For a bumper-like protective end, an end-cap 465 may additionally be attached by a screw 565 to a flat-mount end plate 75 of the single-receptacle side-opening modules of the load support assembly.

As illustrated in FIG. 11, a modular assembly (as presently disclosed and disclosed in International Application No. PCT/CA2017/050376 and International Application No. PCT/CA2018/051193) may additionally comprise a counterbalance assembly which, by attachment to a cable passing over a pulley cross-support assembly and attached to a load support assembly, negates the weight of the load support assembly and mounted camera or other device or load which may be positioned and moved along a vertical rail assembly.

A counterbalanced vertical track system 5 may comprise a counterbalance assembly 30 suspended from the cable with looped ends 32 and a carabiner 34, as shown in FIG. 3, to an eyebolt 520 securely engaged with the side of a single-receptacle side-opening module 525 by a concave mount component 160 and a T-nut 100 securely held in the top-facing nut channel 610 in the tube segment 615 of the side-opening module 525.

For varying weights of the counterbalance assembly 30 to match varying weights of corresponding load support assembly 25 and mounted camera or other device or load, one or more counterweight components 505 may be mounted by screws 510 passed through holes 515 in the counterweight components 505 to be threadably engaged by T-nuts 100 securely held within the nut channels of the side-opening module 525.

For retained vertical movement of a corresponding load support assembly and supported camera or other device or load, a counterbalance assembly 30 may be retained and is moveable on a vertical rail assembly 15 by a rail-rolling module 530 such as the rail-rolling modules previously disclosed in International Application No. PCT/CA2017/050376. The cable-suspended side-opening module 525 is demountably engaged with a side of the rail-rolling module 530 via a male member flat-mount assembly 320 and male spacer plate 315 mounted by screws 65 to the side of the rail-rolling module at threaded bores 535.

As illustrated in FIG. 12, a counterbalance assembly can be freely suspended from a cable with looped ends 620 and carabiner 625 by a tube-end eyebolt assembly 630 which comprises an eyebolt with lock nut 635 threadably engaged with a center threaded bore 640 in an eyebolt-mount end plate 645 which may fastened by screws 80 passed through unthreaded bores 650 to be threadably engaged with thread-forming slots 655 in a corresponding tube segment of another module of the system such as side-opening module 525.

One or more counterweight components 505 may be mounted by screws 510 passed through holes 515 in the counterweight components 505 to be threadably engaged by T-nuts 100 securely held within the nut channels of the side-opening module 525.

For a bumper-like protective end, a dome pad module 660 may additionally be included in an assembly by demountable engagement of its male member flat-mount assembly 320 within the receptacle socket 185 of the side-opening module 525.

It is to be noted that the present male member side-mount assemblies 110, and male member flat-mount assemblies 320 are configured for rotatable or locked engagement with the rotator receptacles "11" shown in FIGS. 1, 4, etc. of International Application No. PCT/CA2017/050376. It is to be noted that the present male member side-mount assembly 110, and male member flat-mount assembly 320 are also configured for demountable engagement with the joiner receptacles "211" shown in FIGS. 6, 17, etc. of International Application No. PCT/CA2017/050376. It is to be noted that the present male member flat-mount assembly 320 is also configured for demountable engagement with the 45° side-mount bracket module "350", male member mounting block modules "355", "356", "357", "358", "359", "360", the 5° increment adjustable male member mount module "380", and the male mount slider component "450" shown in FIGS. 13, 14, 15, 17, as well as with a castor wheel module "560", a leveling foot module "580", an end-cap module "625", or a male dome pad end-cap module "650" shown in FIGS. 23, 24, 28, and 30 of International Application No. PCT/CA2017/050376.

The length of the pulley cross-support assemblies disclosed herein may be, for example, 6", 12", 18", 24", 32", 36", 42", 48", 60", 72", 84", 96" and therebetween. The length of the pulley cross-support assemblies disclosed herein may be, for example, 15 cm, 30 cm, 45 cm, 60 cm, 81 cm, 91 cm, 106 cm, 122 cm, 150 cm, 180 cm, 210 cm, 240 cm, and therebetween. It is suitable to adjust the width of the present pulley assemblies to increase proportionally with an increase in the length of the pulley assemblies to maintain and preserve the robustness, stability, and durability of the pulley assemblies when in use. It is suitable to adjust the dimensions of the female end components and the male end components in proportion to the width and length of the pulley assemblies to maintain and preserve the robustness, stability, and durability of the pulley assemblies when in use.

NUMBERING KEY

5—counterbalanced vertical track assembly (FIGS. 1 and 2)
10—first pulley cross-support assembly
15—vertical rail assembly
20—cart base assembly
25—load support assembly
30—counterbalance assembly
32—cable with looped ends
34—carabiners
35—pulley module (FIG. 3)
40—first tube segment
45—pulley
50—shaft
55—set screws
60—pulley brackets
62—threaded bores
65—screws
70—bracket mount plate
71—locator pegs
72—screw
73—locator holes
74—center threaded bore
75—flat-mount end plate
80—tube-end screws
85—unthreaded bores
90—thread-forming slots
95—channel openings
100—T-nut
105—nut channels
110—male member side-mount assembly
115—tube-middle threaded insert mounts
120—threaded insert holes
125—threaded insert
130—side-mount bores
135—bolt
140—male component
145—wide pivot component
150—octagonal boss
155—octagonal recess
160—concave mount component
165—locator teeth
170—locator holes
175—prongs
180—first female end (FIG. 4)
185—side-opening receptacle socket
190—male member channels
195—prong-retaining slots
200—tube bore
205—second tube segment
210—unthreaded bore
215—male unthreaded bore
220—side-opening receptacle cover
225—prong-retaining slots
230—side channels
235—nut channels
240—unthreaded bores
245—thread-forming slots
247—hex nuts
248—side-mount bores
250—socket channel openings
252—narrow end
255—indents
260—cover indents
265—first double-receptacle side-opening module (FIG. 5)
270—tube bore
272—third tube segment
275—corner brace
280—screw
285—side-mount bore
290—screw
300—second pulley cross-support assembly (FIG. 6)
305—male pulley assembly
310—second double-receptacle side-opening module
315—male spacer plate
320—male member flat-mount assembly
325—center threaded bore
330—locator holes
335—flat mount component
340—center through-hole
345—locator pegs
348—locator holes
350—third pulley cross-support assembly (FIGS. 7 and 8)
355—repositionable pulley assembly
360—bolts
365—pulley mount component
370—side channels
375—fourth tube segment
380—nut channels
385—unthreaded bores
390—thread-forming slots
395—side-mount screws
400—side-mount bores
405—threaded bores
410—pulley shaft
412—wide mid-section
415—repositionable pulley brackets
417—shaft holes
420—bolt holes
425—bolt through-holes
430—threaded bores
435—cable-retaining component
440—retaining screw
445—holes
450—third double-receptacle side-opening module
455—fourth double-receptacle side-opening module
460—caster wheel module (FIG. 9)
465—end-cap
470—threaded mount component
475—locator holes
480—center threaded bore
485—caster wheel
490—mount screw
495—lock nut
500—first single-receptacle side-opening module
505—counterweight components
510—screws
515—holes
520—eyebolt (FIG. 10)
525—second single-receptacle side-opening module
530—rail-rolling module
535—threaded bores
540—single-receptacle rotator module
545—third single-receptacle side-opening module
550—fourth single-receptacle side-opening module
555—male bracket assembly
560—multi-angle mount brackets 565—screws
570—plate wedges
575—bracket mount plate
580—double-receptacle rotator module
585—mount-screw
590—dovetail plate
595—dovetail mount assembly
600—tension screw knob
605—handle assembly
610—nut channel
615—fifth tube segment (FIGS. 11 and 12)
620—cable with looped ends
625—large carabiner
630—tube-end eyebolt assembly
635—large eyebolt with lock nut
640—center threaded bore
645—eyebolt-mount end plate
650—unthreaded bores
655—thread-forming slots
660—dome pad module

The invention claimed is:

1. A vertical track assembly configured for controllably moving a load upward and downward, said vertical track assembly comprising:
   a cart base assembly;
   two spaced-apart vertical rails demountably engaged at one end with the cart base assembly;
   a pulley assembly demountably engaged with the other end of the two spaced-apart vertical rails, the pulley assembly comprising an elongate structural support component, a first pulley component demountably engaged with an end of the elongate structural support component, a second pulley component demountably engaged with an opposite end of the elongate structural support component, and a cable in rolling cooperation with the first and second pulley components;
   a first rail-rolling module demountably engaged with one of the two spaced-apart vertical rails, the first rail-rolling module provided with a load support assembly, said load support assembly demountably engaged with a first end of the cable; and
   a second rail-rolling module demountably engaged with the other of the two spaced-apart vertical rails, the second rail-rolling module provided with a counterbalance assembly, said counter balance assembly demountably engaged with a second end of the cable.

2. The vertical track assembly according to claim 1, wherein the counterbalance assembly fastened to the second end of the cable is freely suspended from the pulley assembly.

3. The vertical track assembly according to claim 1, wherein the cart base has a plurality of pivoting casters or fixed wheels or steerable wheels provided for rolling movement of the vertical track assembly.

4. The vertical track assembly according to claim 1, wherein one or more counterweight components are demountably engaged with the cart base to thereby provide increased stability of the vertical track system.

5. The vertical track assembly according to claim 1, wherein the supported load is one or more of a camera, a light, a microphone, a tool, a power tool, and a sensor.

6. The vertical track assembly according to claim 1, wherein the supported load is one or more of a tray, a box, a bucket, and a bag.

7. The vertical track assembly according to claim 1, additionally comprising an elongate structural element having at one or both ends, a threaded hole wherein an eyebolt is demountably engageable.

8. The vertical track assembly according to claim 7 wherein one or both ends of the elongate structural element have an end plate affixed thereto, and wherein the end plates are provided with a threaded hole at their center wherein the eyebolt is demountably engageable.

* * * * *